US011397617B2

(12) United States Patent
Trigalo et al.

(10) Patent No.: US 11,397,617 B2
(45) Date of Patent: Jul. 26, 2022

(54) HARDWARE AND COMMUNICATION RESOURCES SHARING BASED ON USER DIRECTORY GROUP PRIORITY

(71) Applicant: ControlUp Technologies Ltd., Rishon LeTsiyon (IL)

(72) Inventors: Ricky Trigalo, Sunnyvale, CA (US); Ouziel Hadad, Rishon LeTsiyon (IL); Efrat Herbst, Tel Aviv (IL); Gadi Feldman, Beit Hanania (IL)

(73) Assignee: ControlUP Technologies Ltd., Rishon LeTsiyon (IL)

( * ) Notice: Subject to any disclaimer, the term of this patent is extended or adjusted under 35 U.S.C. 154(b) by 89 days.

(21) Appl. No.: 16/798,477

(22) Filed: Feb. 24, 2020

(65) Prior Publication Data

US 2020/0272517 A1    Aug. 27, 2020

Related U.S. Application Data

(60) Provisional application No. 62/809,761, filed on Feb. 25, 2019.

(51) Int. Cl.
*G06F 9/50*    (2006.01)
*G06F 11/34*    (2006.01)

(52) U.S. Cl.
CPC ........ *G06F 9/5011* (2013.01); *G06F 11/3414* (2013.01)

(58) Field of Classification Search
CPC .............. G06F 9/5011; G06F 11/3414; G06F 11/3433; G06F 11/301; G06F 9/5005; G06F 9/5077

See application file for complete search history.

(56) References Cited

U.S. PATENT DOCUMENTS 7,693,847 B1 *  4/2010  Brown .................. G06F 9/5038
                                                      707/694
9,471,385 B1 * 10/2016  Khafizov .............. G06F 9/5038
(Continued)

FOREIGN PATENT DOCUMENTS

WO    2015085475    6/2015

OTHER PUBLICATIONS

Waheed Iqbal et al. Unsupervised Learning of Dynamic Resource Provisioning Policies for Cloud-hosted Multi-tier Web Applications. IEEE Systems Journal • May 2015.
(Continued)

*Primary Examiner* — Benjamin C Wu

(57) ABSTRACT

A system for management of shared hardware and communication resources shared by a plurality of Workload Generators (WGs), the system comprising a processing resource configured to: obtain historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time; determine importance scores for one or more of the WGs, based on the historical and current information of the respective WG; and perform one or more monitoring or management activities associated with one or more of the WGs, based on the importance scores.

15 Claims, 3 Drawing Sheets

(56) References Cited

U.S. PATENT DOCUMENTS

| | | | |
|---|---|---|---|
| 2005/0010664 A1* | 1/2005 | Hubbard | G06F 9/5044 709/224 |
| 2005/0108713 A1* | 5/2005 | Geye | G06F 9/5033 718/100 |
| 2005/0262504 A1* | 11/2005 | Esfahany | G06F 9/5077 718/1 |
| 2009/0138551 A1* | 5/2009 | Hubbard | H04L 9/3239 709/203 |
| 2012/0159367 A1* | 6/2012 | Calcaterra | G06F 9/5011 715/771 |
| 2012/0290725 A1* | 11/2012 | Podila | G06F 9/5011 709/226 |
| 2012/0323853 A1 | 12/2012 | Fries et al. | |
| 2012/0324112 A1* | 12/2012 | Dow | G06F 9/5033 709/226 |
| 2013/0080641 A1 | 3/2013 | Lui et al. | |
| 2014/0032761 A1* | 1/2014 | Beveridge | G06F 9/542 709/226 |
| 2014/0053151 A1* | 2/2014 | Heninger | G06F 9/5083 718/1 |
| 2014/0244843 A1* | 8/2014 | Cao | G06F 9/5088 709/226 |
| 2015/0234671 A1* | 8/2015 | Tomita | G06F 9/5077 718/1 |
| 2015/0295853 A1* | 10/2015 | Pell | G06F 9/455 709/226 |
| 2016/0127255 A1* | 5/2016 | Cobb | G06F 9/5061 709/226 |
| 2016/0283270 A1* | 9/2016 | Amaral | G06F 9/5027 |
| 2016/0314014 A1 | 10/2016 | Dow et al. | |
| 2016/0364265 A1* | 12/2016 | Cao | G06F 9/50 |

OTHER PUBLICATIONS

Yu-Wu Wang et al. Applications of Machine Learning to Resource Management in Cloud Computing. International Journal of Modeling and Optimization, vol. 3, No. 2, Apr. 2013.

* cited by examiner

HARDWARE AND COMMUNICATION RESOURCES SHARING BASED ON USER DIRECTORY GROUP PRIORITY

TECHNICAL FIELD

The invention relates to a system and method for management of shared hardware and communication resources.

BACKGROUND

Current management and monitoring infrastructure solutions that are used to manage shared hardware and communication resources across virtual infrastructure platforms treat Workload Generators (WGs) elements, such as: Virtual Machines (VMs), software containers, micro services, applications, serverless functions and user activities, as equal class citizens when it comes to performing monitoring or management activities such as: resource allocation, automatic operation and self-remediation.

In modern application architectures, when an organization can be running hundreds and thousands of WGs, the WGs are taken for granted as being legitimate and as needing the best service that the management and monitoring infrastructure can offer with regards to monitoring, scheduling, resource allocation, risk detection, optimization and remediation of the WGs. Business value of applications and users inside the WGs, the running applications history, trends, policy attributes and the behavior of other WGs that share resources between them or that communicate with one another, are not taken into consideration when the management and monitoring infrastructure makes prioritized actions with respect to monitoring and optimizing the WGs operation. Such monitoring or optimization activities, taken by the management and monitoring infrastructure, can include scheduling, resource allocation or resource re-allocation, performance of automatic prevention measures for preventing failure to meet service level goals, performance of automatic remediation measures for remediating failure to meet service level goals, performance of automatic troubleshooting measures for troubleshooting, etc. Ignoring the current and historic business value of the WGs when taking monitoring or management actions will result in WGs of high business importance receiving less monitoring or management resources than WGs of lower business importance when monitoring and management resources available to the organization are limited.

In addition, current management and monitoring infrastructure solutions do not provide some of the WGs with a Very Important Person (VIP) treatment with regards to health monitoring and prioritization in terms of operation optimization, even when those WGs are of high business importance to the organization.

There is thus a need in the art for a new method and system for management of shared hardware and communication resources.

References considered to be relevant as background to the presently disclosed subject matter are listed below. Acknowledgement of the references herein is not to be inferred as meaning that these are in any way relevant to the patentability of the presently disclosed subject matter.

US Patent application No. 2013/0080641 (Li el al.) published on Mar. 28, 2013, discloses a method, system and program product, the method comprising determining a first rule set comprising a plurality of patterns of run-time data; obtaining a second rule set comprising a respective priority assigned to respective of the application context IDs and/or user IDs and/or business priorities or combinations of two or more thereof; receiving run-time data for a first plurality of the user IDs; determining application context IDs running on desktops; generating allocation data and/or prioritization data for allocation of electronic resources for user IDs, based at least in part on the second rule set; and sending signals, based on the allocation data and/or the prioritization data.

WIPO Patent application No. 2015/085475 (Weigang el al.) published on Jun. 18, 2015, discloses a method and apparatus for scheduling virtual machine resources. The method comprises: counting historical virtual machine resources distribution information according to historical virtual machine resources request information within a preset history time period; acquiring virtual machine distributed information and idle resources information on a server; calculating a virtual machine resources request distribution deviation degree according to the virtual machine distributed information and the historical virtual machine resources distribution information; according to the virtual machine resources request distribution deviation degree and idle resources information about the server, determining a source server which needs to be transferred out of the virtual machine resources and a destination server which needs to be transferred into the virtual machine resources; transferring distributed virtual machine resources on the source server to the destination server according to a transfer execution instruction; and after receiving virtual machine resources request information, allocating idle resources on the source server after transferring out of the virtual machine resources to a virtual machine resources request corresponding to the virtual machine resources request information.

US Patent application No. 2016/0314014 (Dow et al.) published on Oct. 27, 2016, discloses embodiments related to generating a virtual machine (VM) migration plan. A method includes determining an initial mapping of VMs to hosts as an origin state and a final mapping of VMs to hosts as a goal state. Candidate paths are generated from the initial mapping to the final mapping. The candidate paths are evaluated based on a heuristic state transition cost from the origin state through intermediate states to the goal state by recursively obtaining a list of transitions that a parent state underwent. A heuristic goal cost is identified to reach the goal state from the intermediate states based on a fewest number of VM movements. The VM migration plan is generated based on the heuristic state transition cost of the candidate paths in combination with the heuristic goal cost of a sequence of transitions from the origin state to the goal state having a lowest total cost.

US Patent application No. 2012/0323853 (Fries et al.) published on Dec. 20, 2012, discloses techniques for capturing and analyzing snapshots of virtual machines. One or more computers may automatically obtain snapshots of virtual machines as they are executing to form a pool of virtual machine snapshots. The virtual machine snapshots are then read to obtain a set of features properties of the virtual machine snapshots, including information about a running guest operating system, software installed on the virtual machine, metadata about the virtual machine itself, and others. The features or properties are analyzed, in one embodiment using a machine learning algorithm, to automatically compute and store information about the virtual machines.

Unsupervised Learning of Dynamic Resource Provisioning Policies for Cloud-Hosted Multitier Web Applications (Iqbal, W., Dailey, M. N. and Carrera, D.) published in IEEE SYSTEMS JOURNAL, 10(4), pp. 1435-1446, 2016, discloses dynamic resource provisioning for Web applications allows for low operational costs while meeting service-level objectives (SLOs). However, the complexity of multitier Web applications makes it difficult to automatically provision resources for each tier without human supervision. In this paper, we introduce unsupervised machine learning methods to dynamically provision multitier Web applications, while observing user-defined performance goals. The proposed technique operates in real time and uses learning techniques to identify workload patterns from access logs, reactively identifies bottlenecks for specific workload patterns, and dynamically builds resource allocation policies for each particular workload. We demonstrate the effectiveness of the proposed approach in several experiments using synthetic workloads on the Amazon Elastic Compute Cloud (EC2) and compare it with industry-standard rule-based autoscale strategies. Our results show that the proposed techniques would enable cloud infrastructure providers or application owners to build systems that automatically manage multitier Web applications, while meeting SLOs, without any prior knowledge of the applications' resource utilization or workload patterns.

Applications of Machine Learning To Resource Management In Cloud Computing (Huang, C. J., Wang, Y. W., Guan, C. T., Chen, H. M. and Jian, J. J.) published in INTERNATIONAL JOURNAL OF MODELING AND OPTIMIZATION, 3(2), p. 148, 2013, discloses various significant issues in resource allocation, such as maximum computing performance and the green computing, attract researchers' attentions recently. Therefore, how to accomplish tasks with the lowest cost has become an important issue when the resource on the earth is getting less. The goal of this research is to design a sub-optimal resource allocation system in cloud computing environment. A prediction mechanism is realized by using Support Vector Regressions (SVRs) to estimate the response time in the next measurement period, and the resources are redistributed based on the current status of all virtual machine installed in physical machines. Notably, a resource dispatch mechanism using genetic algorithms (GAs) is proposed in this study to determine the reallocation of resources. The experimental results show that the proposed scheme achieves an effective configuration via reaching the agreement between the utilization of resources within physical machine monitored 30o by physical machine monitor and Service Level Agreements (SLA) between virtual machines operator and cloud services provider. In addition, our proposed mechanism can fully utilize hardware resources and maintain desirable performance in the cloud environment.

GENERAL DESCRIPTION

In accordance with a first aspect of the presently disclosed subject matter, there is provided a system for management of shared hardware and communication resources shared by a plurality of Workload Generators (WGs), the system comprising a processing resource configured to: obtain historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time; determine importance scores for one or to more of the WGs, based on the historical and current information of the respective WG; and perform one or more monitoring or management activities associated with one or more of the WGs, based on the importance scores.

In some cases, the processing resource is further configured to identify, for at least one given WG of the WGs, currently resource sharing WGs of the WGs, being WGs that currently share at least part of the hardware and communication resources with the given WG; and wherein the importance score of at least part of the WGs is determined also based on a resource sharing environment score of the resource sharing WGs of the respective WG.

In some cases, the resource sharing environment score is based on the importance scores of the resource sharing WGs of the respective WG.

In some cases, the resource sharing environment score is an average of the importance scores of the resource sharing WGs of the respective WG.

In some cases, the processing resource is further configured to identify, for at least one given WG of the WGs, currently connected WGs of the WGs, being WGs that are currently connected to the given WG; and wherein the importance score of at least part of the WGs is determined also based on a connected environment score of the connected WGs of the respective WG.

In some cases, the connected environment score is based on the importance scores of the connected WGs of the respective WG.

In some cases, the connected environment score is a maximal importance score of the importance scores of the connected WGs of the respective WG.

In some cases, the WG usage attributes include one or more of: (a) one or more user characteristics of one or more respective users conducting one or more sessions on the respective WG, (b) one or more session characteristics of the one or more sessions, (c) one or more application identifiers of one or more respective applications executing on the respective WG, (d) one or more application characteristics of one or more remote applications to which the respective WG is connected, or (e) one or more connection characteristics of a connection to one or more remote applications to which the respective WG is connected.

In some cases, the importance scores are determined also based on the historical and current information of similar WGs, being WGs having similarity characteristics that are similar to the characteristics of the respective WG.

In some cases, the similarity characteristics include types of users conducting one or more sessions, types of sessions, type of executing applications, actual consumptions of resources over a given time duration, virtual compute level, Input/output Operations Per Second (IOPS), network communication latency, network communication bandwidth, storage communication bandwidth, number of remote connections to the WG, operating system characteristics, or running backup services.

In some cases, the historical and current information is obtained from agents executing on the WGs.

In some cases, the management activity includes one or more of: resource allocation or resource re-allocation; performance of automatic prevention measures for preventing failure to meet service level goals; performance of automatic remediation measures for remediating failure to meet service level goals, performance of automatic troubleshooting measures for troubleshooting.

In some cases, the management activity is resource allocation or resource re-allocation, and wherein shared hardware and communication resources are allocated or re-allocated based on a prioritization policy.

In some cases, the prioritization policy indicates that WGs having higher importance score are allocated or re-allocated with more resources than WGs having lower importance score.

In some cases, the management activity is performance of automatic prevention measures, and wherein more resources are allocated for automatic prevention measures for WGs having higher importance score than for WGs having lower importance score.

In some cases, the management activity is performance of automatic remediation measures, and wherein more resources are allocated for automatic remediation measures for WGs having higher importance score than for WGs having lower importance score.

In some cases, the management activity is performance of automatic troubleshooting measures, and wherein more resources are allocated for automatic troubleshooting measures for WGs having higher importance score than for WGs having lower importance score.

In some cases, the shared hardware and communication resources include one or more of: CPU, memory, bandwidth, or storage space.

In some cases, the importance scores are determined also based on pre-defined rules.

In some cases, the pre-defined rules depend on at least one of: a date, a time of day, information of one or more calendar events, geographic locations of users connecting to the WGs, session protocols, or security permissions.

In some cases, the processing resource is further configured to identify, based on the importance score, a sub-group of WGs of the WGs, being high importance WGs, and wherein the high importance WGs are allocated with more resources than other WGs of the WGs that are not part of the high importance WGs.

In some cases, the importance scores are determined using a machine learning engine, utilizing the historical and current information.

In some cases, each of WGs is one of the following: a virtual machine, a microservice, a serverless function or a software container.

In some cases, the monitoring activity includes providing a user with information relating to monitored WGs of the WGs, wherein the monitored WGs are selected from the WGs based on a resource utilization threshold, wherein the resource utilization threshold depends on the importance scores, wherein the current utilizations of the portions of the shared hardware and communication resources monitored WGs is above the resource utilization threshold.

In accordance with a second aspect of the presently disclosed subject matter, there is provided a method for management of shared hardware and communication resources shared by a plurality of Workload Generators (WGs), the method comprising: obtaining, by a processing resource, historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time; determining, by the processing resource, importance scores for one or more of the WGs, based on the historical and current information of the respective WG; and performing, by the processing resource, one or more monitoring or management activities associated with one or more of the WGs, based on the importance scores.

In some cases, the method further comprising identifying, by the processing resource, for at least one given WG of the WGs, currently resource sharing WGs of the WGs, being WGs that currently share at least part of the hardware and communication resources with the given WG; and wherein the importance score of at least part of the WGs is determined also based on a resource sharing environment score of the resource sharing WGs of the respective WG.

In some cases, the resource sharing environment score is based on the importance scores of the resource sharing WGs of the respective WG.

In some cases, the resource sharing environment score is an average of the importance scores of the resource sharing WGs of the respective WG.

In some cases, the method further comprising identifying, by the processing resource, for at least one given WG of the WGs, currently connected WGs of the WGs, being WGs that are currently connected to the given WG; and wherein the importance score of at least part of the WGs is determined also based on a connected environment score of the connected WGs of the respective WG.

In some cases, the connected environment score is based on the importance scores of the connected WGs of the respective WG.

In some cases, the connected environment score is a maximal importance score of the importance scores of the connected WGs of the respective WG.

In some cases, the WG usage attributes include one or more of: (a) one or more user characteristics of one or more respective users conducting one or more sessions on the respective WG, (b) one or more session characteristics of the one or more sessions, (c) one or more application identifiers of one or more respective applications executing on the respective WG, (d) one or more application characteristics of one or more remote applications to which the respective WG is connected, or (e) one or more connection characteristics of a connection to one or more remote applications to which the respective WG is connected.

In some cases, the importance scores are determined also based on the historical and current information of similar WGs, being WGs having similarity characteristics that are similar to the characteristics of the respective WG.

In some cases, the similarity characteristics include types of users conducting one or more sessions, types of sessions, type of executing applications, actual consumptions of resources over a given time duration, virtual compute level, Input/output Operations Per Second (IOPS), network communication latency, network communication bandwidth, storage communication bandwidth, number of remote connections to the WG, operating system characteristics, or running backup services.

In some cases, the historical and current information is obtained from agents executing on the WGs.

In some cases, the management activity includes one or more of: resource allocation or resource re-allocation; performance of automatic prevention measures for preventing failure to meet service level goals; performance of automatic remediation measures for remediating failure to meet service level goals, performance of automatic troubleshooting measures for troubleshooting.

In some cases, the management activity is resource allocation or resource re-allocation, and wherein shared hardware and communication resources are allocated or re-allocated based on a prioritization policy.

In some cases, the prioritization policy indicates that WGs having higher importance score are allocated or re-allocated with more resources than WGs having lower importance score.

In some cases, the management activity is performance of automatic prevention measures, and wherein more resources are allocated for automatic prevention measures for WGs having higher importance score than for WGs having lower importance score.

In some cases, the management activity is performance of automatic remediation measures, and wherein more resources are allocated for automatic remediation measures for WGs having higher importance score than for WGs having lower importance score.

In some cases, the management activity is performance of automatic troubleshooting measures, and wherein more resources are allocated for automatic troubleshooting measures for WGs having higher importance score than for WGs having lower importance score.

In some cases, the shared hardware and communication resources include one or more of: CPU, memory, bandwidth, or storage space.

In some cases, the importance scores are determined also based on pre-defined rules.

In some cases, the pre-defined rules depend on at least one of: a date, a time of day, information of one or more calendar events, geographic locations of users connecting to the WGs, session protocols, or security permissions.

In some cases, the method further comprising identifying, by the processing resource, based on the importance score, a sub-group of WGs of the WGs, being high importance WGs, and wherein the high importance WGs are allocated with more resources than other WGs of the WGs that are not part of the high importance WGs.

In some cases, the importance scores are determined using a machine learning engine, utilizing the historical and current information.

In some cases, each of WGs is one of the following: a virtual machine, a microservice, a serverless function or a software container.

In some cases, the monitoring activity includes providing a user with information relating to monitored WGs of the WGs, wherein the monitored WGs are selected from the WGs based on a resource utilization threshold, wherein the resource utilization threshold depends on the importance scores, wherein the current utilizations of the portions of the shared hardware and communication resources monitored WGs is above the resource utilization threshold.

In accordance with a third aspect of the presently disclosed subject matter, there is provided a non-transitory computer readable storage medium having computer readable program code embodied therewith, the computer readable program code, executable by at least one processor of a computer to perform a method of: obtaining, by a processing resource, historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time; determining, by the processing resource, importance scores for one or more of the WGs, based on the historical and current information of the respective WG; and performing, by the processing resource, one or more monitoring or management activities associated with one or more of the WGs, based on the importance scores.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
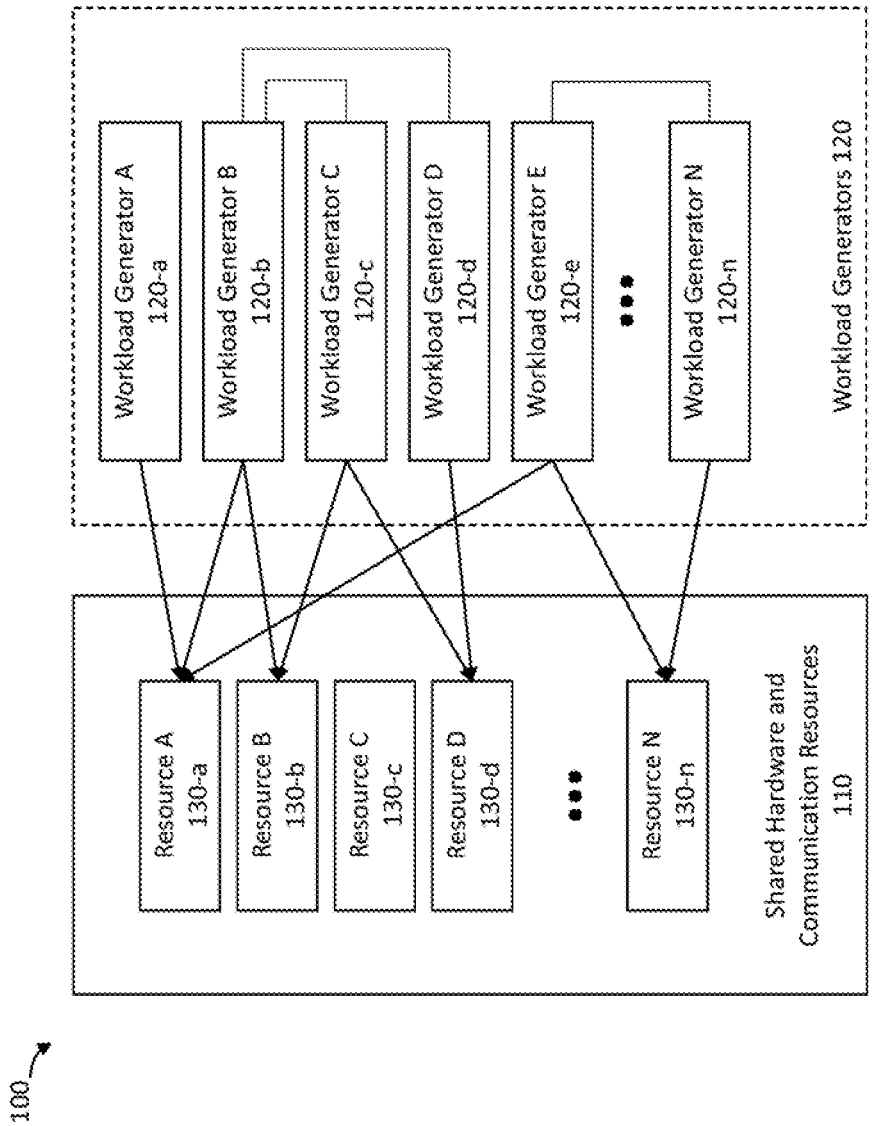
FIG. 1 is a schematic illustration of an example environment for shared hardware and communication resources management, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "determining", "identifying", "performing", "managing" or the like, include action and/or processes of a computer that manipulate and/or transform data into other data, said data represented as physical quantities, e.g. such as electronic quantities, and/or said data representing the physical objects. The terms "computer". "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
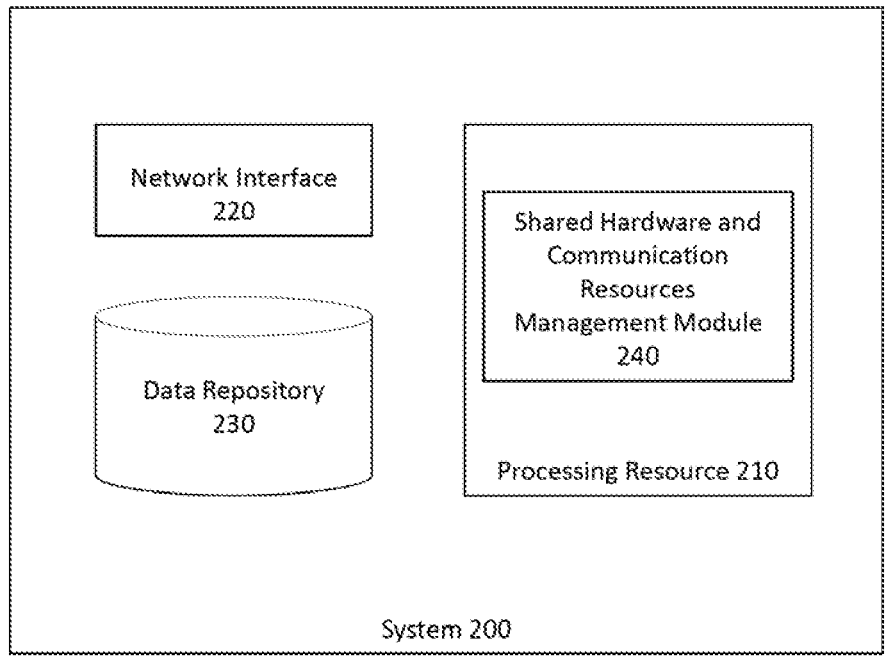
FIG. 2 is a block diagram schematically illustrating one example of a shared hardware and communication resources management system, in accordance with the presently disclosed subject matter.
Figure 3:
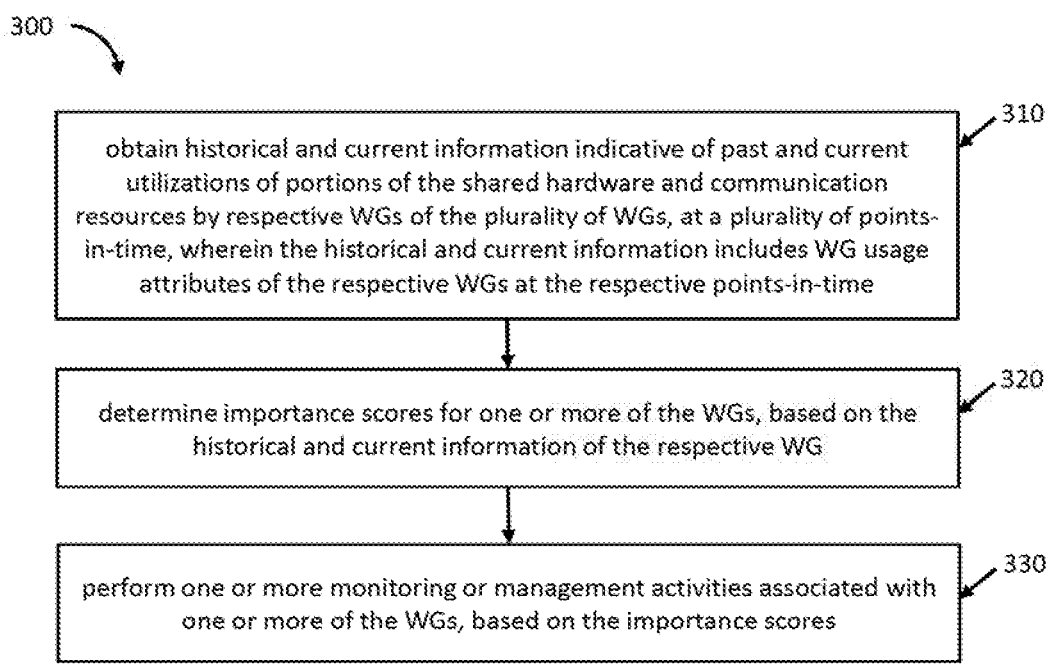
FIG. 3 is a flowchart illustrating one example of a sequence of operations carried out for the management of shared hardware and communication resources, in accordance with the presently disclosed subject matter.
Figure 4:
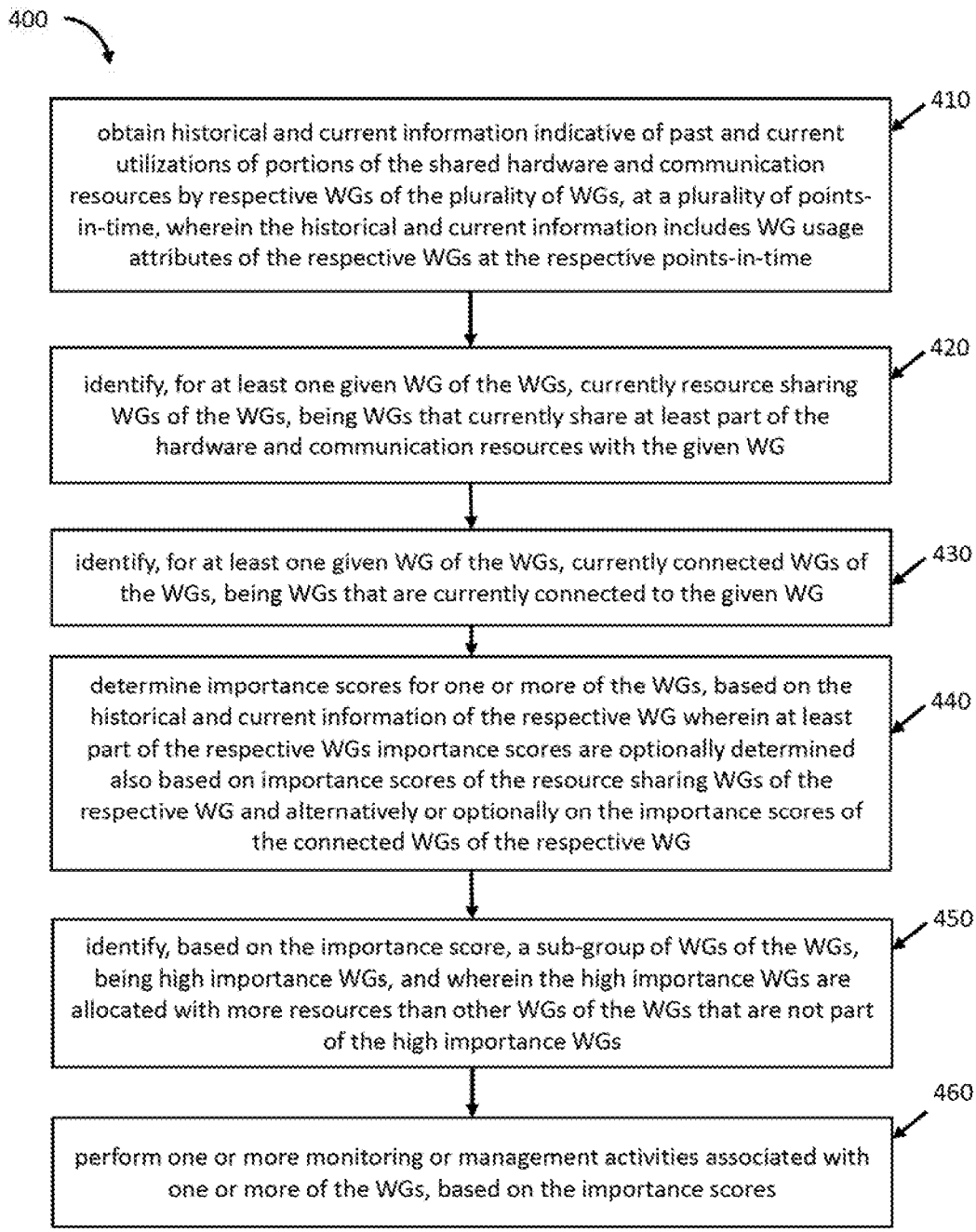
FIG. 4 is a flowchart illustrating an additional detailed and comprehensive example of a sequence of operations carried out for the management of shared hardware and communication resources, in accordance with the presently disclosed subject matter.

In embodiments of the presently disclosed subject matter, fewer, more and/or different stages than those shown in FIGS. 3-4 may be executed. In embodiments of the presently disclosed subject matter one or more stages illustrated in FIGS. 3-4 may be executed in a different order and/or one or more groups of stages may be executed simultaneously. FIGS. 1-2 illustrate a general schematic of the system architecture in accordance with an embodiment of the presently disclosed subject matter. Each module in FIGS. 1-2 can be made up of any combination of software, hardware and/or firmware that performs the functions as defined and explained herein. The modules in FIGS. 1-2 may be centralized in one location or dispersed over more than one location. In other embodiments of the presently disclosed subject matter, the system may comprise fewer, more, and/or different modules than those shown in FIGS. 1-2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a schematic illustration of an example environment for shared hardware and communication resources management, in accordance with the presently disclosed subject matter.

According to the presently disclosed subject matter, environment 100, includes shared hardware and communication resources 110. Shared hardware and communication resources 110 can be shared as part of a virtualization and/or a cloud-based infrastructure platform, including: hypervisors and hyperconverged virtualization infrastructure platforms. The shared hardware and communication resources 110 can include one or more resources (i.e. resource A 130-*a*, resource B 130-*b*, resource C 130-*c*, resource D 130-*d*, . . . , resource N 130-*n*). Resources (i.e. resource A 130-*a*, resource B 130-*b*, resource C 130-*c*, resource D 130-*d*, . . . , resource N 130-*n*) can be one or more of: host machines, Central Processing Units (CPUs), memory, network elements (e.g. switches, network adapters, firewalls, load balancers, etc.), bandwidth, storage space (e.g. storage servers, disk arrays, tapes, etc.) or any other hardware or communication resource that can be shared. Resources (i.e. resource A 130-*a*, resource B 130-*b*, resource C 130-*c*, resource D 130-*d*, . . . , resource N 130-*n*) can be part of one or more data centers.

A shared hardware and communication resources management system can monitor and control the shared hardware and communication resources 110 within the virtualization and/or cloud-based platforms in order to optimize resource (i.e. resource A 130-*a*, resource B 130-*b*, resource C 130-*c*, resource D 130-*d*, . . . , resource N 130-*n*) utilization. The shared hardware and communication resources management system can provide optimal or near-optimal operational efficiency across participating data centers.

Environment 100 further includes one or more Workload Generators (WGs) 120 (i.e. workload generator A 120-*a*, workload generator B 120-*b*, workload generator C 120-*c*, workload generator D 120-*d*, workload generator E 120-*e*, . . . , workload generator N 120-*n*). Each WGs 120 can be one or more of the following: a Virtual Machine (VM), a micro service, a software container, an application, a serverless function, a user activity or any other workload generator.

Each given WG 120 provides functionality and can be managed and monitored by the shared hardware and communication resources management system, providing the given WG 120 with the resources (i.e. one or more of: resource A 130-*a*, resource B 130-*b*, resource C 130-*c*, resource D 130-*d*, . . . , resource N 130-*n*) required for its proper function.

Each given WGs 120 can have one or more of the following usage attributes: one or more user characteristics (e.g. user identity, active directory groups the user is associated with, user behavior, user's security permissions etc.) of one or more respective users conducting one or more sessions on the given WG 120, one or more session characteristics (e.g. session protocol, session duration, number of sessions opened in parallel for each user, etc.) of the one or more sessions, one or more application identifiers of one or more respective applications executing on the given WG 120, one or more application characteristics (e.g. type of application, application activity time for each user, application is running in the foreground or just opened in the background, application's security permissions, etc.) of one or more remote applications to which the given WG 120 is connected, or one or more connection characteristics of a connection to one or more remote applications (e.g. type of remote application, remote application activity time for each user, remote application's security permissions, etc.) to which the given WG 120 is connected and one or more communication topology characteristics (e.g. how many entities are connected to the given WG 120, what is the topology of the connections, etc.). These attributes' values can change over time.

The values of the attributes can be collected, over time, by the shared hardware and communication resources management system. In some cases, the collection can be done by an in-guest agent running inside the WG 120 (for example: for a WG 120 that is a VM, the collection can be achieved by a software agent running inside the VM, collecting the values of the attributes of the VM over time and reporting them to the shared hardware and communication resources management system). In other cases, the collection can be by shared hardware and communication resources management system externally monitoring the WGs 120. The shared hardware and communication resources management system can utilize the collected current and historical attributes' values to determine an importance score for a given WG 120 based on a set of pre-defined rules and/or on Machine Learning (ML) algorithms, as further detailed herein, inter alia with respect to FIGS. 3 and 4.

The importance score of a given WG 120 can be inductive of the business value of the functionality provided by the given WG 120 to the organization. For example: a given VM used by the CEO of the organization can receive a higher score importance score than other VMs used by other employees of the organization. In another example, a given container provides functionality for a store front of the most valuable product of the organization. The given container can receive a higher importance score than another container that supports web surfing by the employees of the organization.

In many cases, shared hardware and communication resources 110 available to a specific organization are limited due to lack of resources, inefficient resource planning, malfunctions or other reasons. In these cases, the shared hardware and communication resources management system prioritize the resources (i.e. one or more of: resource A 130-a, resource B 130-b, resource C 130-c, resource D 130-d, . . . , resource N 130-n) available to the WGs 120 of the organization in accordance with the importance score of these WGs 120. This leads to better utilization of the limited organizational shared hardware and communication resources 110, as WGs 120 that have more business value to the organization will have higher importance scores and thus will receive more monitoring and management resources from the shared hardware and communication resources management system.

The shared hardware and communication resources management system can further identify, for a given WG 120, currently resource sharing WGs 120, being WGs 120 that currently share at least part of the shared hardware and communication resources 110 (i.e. one or more of: resource A 130-a, resource B 130-b, resource C 130-c, resource D 130-d, . . . , resource N 130-n) with the given WG 120. It is to be noted that currently resource sharing WGs 120 for a given WG 120 can change over time as the resources (i.e. one or more of: resource A 130-a, resource B 130-b, resource C 130-c, resource D 130-d, . . . , resource N 130-n) utilized by the given WG 120 change over time. The shared hardware and communication resources management system can optionally and alternatively utilize the importance scores of the currently resource sharing WGs 120 of the given WG 120 to further determine the importance score for the given WG 120.

In a non-limiting illustrated example in FIG. 1, workload generator A 120-a utilizes resource A 130-a of the shared hardware and communication resources 110. Workload generator B 120-b and workload generator E 120-e also utilize resource A 130-a, thus the shared hardware and communication resources management system will identify workload generator B 120-b and workload generator E 120-e as the currently resource sharing WGs 120 of workload generator A 120-a. In a similar way, the shared hardware and communication resources management system will identify workload generator A 120-a and workload generator C 120-c as the currently resource sharing WGs 120 of workload generator B 120-b since workload generator A 120-a shares resource A 130-a with workload generator B 120-b and workload generator C 120-c shares resource B 130-b with workload generator B 120-b.

The shared hardware and communication resources management system can further identify, for a given WG, currently connected WGs 120, being WGs 120 that are currently connected to the given WG 120. The connection can be a bi-directional or a unidirectional communication link between the given WG 120 and the currently connected WGs 120. It is to be noted that currently connected WGs 120 for a given WG 120 can change over time as the communication connections between the WGs 120 change over time.

Continuing the non-limiting illustrated example in FIG. 1, workload generator B 120-b has communication connections to workload generator C 120-c and workload generator D 120-d, thus the shared hardware and communication resources management system will identify workload generator C 120-c and workload generator D 120-d as the currently connected WGs 120 of workload generator B 120-b. In a similar way, the shared hardware and communication resources management system will identify workload generator N 120-n as the currently connected WGs 120 of workload generator E 120-e since workload generator N 120-n has a communication connection with workload generator E 120-e.

Optionally and alternatively, the shared hardware and communication resources management system can utilize the importance scores of the currently connected WGs 120 of the given WG 120 to further determine the importance score for the given WG 120.

The shared hardware and communication resources management system can perform one or more monitoring or management activities for the given WG 120, as further detailed herein, inter alia with respect to FIGS. 3 and 4.

Attention is now drawn to FIG. 2, a block diagram schematically illustrating one example of a shared hardware and communication resources management system, in accordance with the presently disclosed subject matter.

According to certain examples of the presently disclosed subject matter, system 200 can comprise, or be otherwise associated with, a data repository 230 (e.g. a database, a storage system, a memory including Read Only Memory—ROM, Random Access Memory—RAM, or any other type of memory, etc.) configured to store data, including, inter alia, resources (i.e. one or more of: resource A 130-a, resource B 130-b, resource C 130-c, resource D 130-d, . . . , resource N 130-n) utilization levels, WGs 120 attribute values, etc. Data repository 230 can be further configured to enable retrieval and/or update and/or deletion of the stored data. It is to be noted that in some cases, data repository 230 can be distributed, while the system 200 has access to the information stored thereon, e.g. via a wired or wireless network to which system 200 is able to connect to.

It is to be noted that the terms system 200 and shared hardware and communication resources management system 200 are used herein interchangeably.

Shared hardware and communication resources management system 200 may further comprise a network interface 220 (e.g. a network card, a WiFi client, a LiFi client, 3G/4G client, or any other network connection enabling component), enabling system 200 to communicate over a wired or wireless network with one or more resources (i.e. one or more of: resource A 130-a, resource B 130-b, resource C 130-c, resource D 130-d, . . . , resource N 130-n) and/or with one or more of the WGs 120. In some cases, at least some of the connections are over the Internet.

System 200 further comprises a processing resource 210. Processing resource 230 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 200 resources and for enabling operations related to system 200 resources.

The processing resource 210 can contain the following module: shared hardware and communication resource management module 240.

shared hardware and communication resource management module 240 can be configured to obtain current and historical values of usage attributes of the WGs 120, determine importance scores for one or more of the WGS 120, and perform one or more monitoring or management activities, as further detailed herein, inter alia with reference to FIGS. 3 and 4.

FIG. 3 is a flowchart illustrating one example of a sequence of operations carried out for the management of shared hardware and communication resources, in accordance with the presently disclosed subject matter.

According to certain examples of the presently disclosed subject matter, shared hardware and communication resources management system 200 can be configured to perform a shared hardware and communication management process 300, e.g. by shared hardware and communication resources management system 200 utilizing the shared hardware and communication management module 240.

As detailed above, in many cases, shared hardware and communication resources 110 available to a specific organization are limited due to lack of resources, inefficient resource planning, malfunctions or other reasons. In these cases, the shared hardware and communication resources management system 200 needs to prioritize the resources (i.e. one or more of: resource A 130-a, resource B 130-b, resource C 130-c, resource D 130-d, . . . , resource N 130-n) available to the WGs 120 of the organization. For this purpose, shared hardware and communication resources management system 200 is required to determine importance score for the WGs 120 of the organization. The shared hardware and communication resources management system 200 can utilize the importance scores in order to prioritize the WGs 120 correctly. This can lead to better utilization of the limited organizational shared hardware and communication resources 110, as WGs 120 that have more business value to the organization will have higher importance scores and thus will receive more monitoring and management resources from the shared hardware and communication resources management system 200.

For this purpose, shared hardware and communication resources management system 200 can be configured to obtain historical and current information indicative of past and current utilizations of portions of the shared hardware and communication resources 110 by respective WGs 120, at a plurality of points-in-time, wherein the historical and current information includes WG 120 usage attributes of the respective WGs 120 at the respective points-in-time (block 310).

A given WG 120 usage attributes can include one or more of the following: one or more user characteristics (e.g. user identity, active directory groups the user is associated with, user behavior, user's security permissions etc.) of one or more respective users conducting one or more sessions on the given WG 120, one or more session characteristics (e.g. session protocol, session duration, number of sessions opened in parallel for each user, etc.) of the one or more sessions, one or more application identifiers of one or more respective applications executing on the given WG 120, one or more application characteristics (e.g. type of application, application activity time for each user, application is running in the foreground or just opened in the background, application's security permissions, etc.) of one or more remote applications to which the given WG 120 is connected, or one or more connection characteristics of a connection to one or more remote applications (e.g. type of remote application, remote application activity time for each user, remote application's security permissions, etc.) to which the given WG 120 is connected and one or more communication topology characteristics (e.g. how many entities are connected to the given WG 120, what is the topology of the connections, etc.). The values of these attributes can change over time.

The values of the attributes can be collected, over time, by the shared hardware and communication resources management system 200. In some cases, the collection can be done by an in-guest agent running inside the WG 120 (for example: for a WG 120 that is a VM, the collection can be achieved by a software agent running inside the VM, collecting the values of the attributes of the VM over time and reporting them to the shared hardware and communication resources management system 200). In other cases, the collection can be by shared hardware and communication resources management system 200 externally monitoring the WGs 120. The shared hardware and communication resources management system 200 can utilize the collected current and historical attributes' values to determine an importance score for a given WG 120.

An unlimiting example can be of the shared hardware and communication resources management system 200 collecting user information, including active directory groups the user is associated with, for the users of a given WG 120 over time. In one point of time the given WG 120 is used by a user that is part of the "administrators" active directory group—at that point of time the given WG 120 will receive a relative high importance score. At a later point in time, the WG 120 is used by a user associated with the "users" active directory group and the given WG 120 importance score will be lowered.

Based on the obtained information, shared hardware and communication resources management system 200 can be configured to determine importance scores for one or more of the WGs 120, based on the historical and current information of the respective WG (block 320).

The shared hardware and communication resources management system 200 can utilize the collected current and historical usage attributes' values of a given WG 120 to determine an importance score for the given WG 120 based on a set of pre-defined rules and/or on Machine Learning (ML) algorithms.

Each pre-defined rule of the set of pre-defined rules defines a relation between certain usage attributes' values and an increase (or decrease) in the important score. An exemplary pre-defined rule can be to increase the priority score of a given WG 120 if a user of the given WG 120 is part of the "administrators" active directory group.

The pre-defined rules can be related with open sessions and the usage attributes' values obtained can be the number of open sessions for a given WG 120. An exemplary pre-defined rule can be to increase the importance score of the given WG 120 if the number of open sessions is above a certain threshold.

The pre-defined rules can be related with data sensitivity and the usage attributes' values obtained can be the level of sensitivity of the data that a given WG 120 is using. An exemplary pre-defined rule can be to increase the importance score of the given WG 120 if the sensitivity of the data is high.

The pre-defined rules can be related with security permissions and the usage attributes' values obtained can be the security permissions of applications of a given WG 120. An exemplary pre-defined rule can be to increase the importance score of the given WG 120 if the applications have higher security permissions.

The pre-defined rules can be related with process activity and the usage attributes' values obtained can be the level of activity of processes of a given WG 120 (e.g. CPU, disk reads/writes, etc.). An exemplary pre-defined rule can be to decrease the importance score of the given WG 120 if the processes associated with it are just open in the background but do not do any processing work. In addition, process importance can be determined from the process priority given to a given process by the processor.

The pre-defined rules can be related with storage and the usage attributes' values obtained can be the level of business importance of application working with a given storage WG 120 which functions as storage. An exemplary pre-defined rule can be to increase the importance score of the given storage WG 120 if the application it is serving are of high business importance.

The set of pre-defined rules can be applied by the shared hardware and communication resources management system 200 on the current and historical information obtained in block 310 to determine an impotence score for a given WG 120.

In some cases, the pre-defined rules depend on additional information available to the shared hardware and communication resources management system 200, additional to the usage attributes' values obtained in block 310. The additional information can be at least one of: a date, a time of day, information of one or more calendar events, geographic locations of users connecting to the WGs 120, session protocols or security permissions.

An exemplary pre-defined rule, that depend on additional information, can be a date dependent rule that for specific calendar dates (for example: on Black Friday) increases the importance score for WGs 120 that are associated with the retail functionality of the organization. Another example can be a geographical dependent rule that decreases the importance score of WGs 120 which have users connecting to them from a specific geographic location, assuming that network latency from that geographic location is high anyway, so lowering the impotence score for these WGs 120 will not affect these users. In addition, latency can be associated with users connecting from specific branches of the organization (headquarters, support site, development site, etc.) or even from specific Internet Protocol (IP) addresses. An additional example can be a session protocol dependent rule that increases or decreases the importance score of a given WG 120 based on the session protocol used by users to connect to the given WG 120. Certain protocols, such as HDX session protocol, are used for less important tasks, thus the impotence score for WGs 120 with users using the HDX session protocol will be decreased. On the other hand, Remote Desktop Protocol (RDP) and Virtual Network Computing (VNC) based session protocols, are used for more important tasks, thus the importance score for WGs 120 with users using RDP or VNC session protocol will be increased.

In some cases, the pre-defined rules are defined by one or more experts.

Additionally, or alternatively, the importance scores can be determined by the shared hardware and communication resources management system 200 using a Machine Learning (ML) engine to run ML algorithms analyzing the historical and current information obtained in block 310 to recognize trends and patterns in the information and to generate classifiers that can automatically grade a given WG 120 with a recommended importance score based on the usage attributes' values of the given WG 120.

In some cases, one or more of the ML algorithms can be supervised ML algorithms—where at least part of the historical and current information obtained in block 310 is labeled as "desirable state" or "undesirable state". The supervised ML algorithms can be trained on the labeled information to find statistical relations between an unclassified state and the label. The shared hardware and communication resources management system 200 can use the statistical relation to determine the importance score for a given WG 120. In some cases, the labeling of the historical and current information obtained in block 310 is done by experts. In some cases, the labeling of the historical and current information obtained in block 310 is done automatically by an automated labeling system.

In some cases, one or more of the ML algorithms can be un-supervised ML algorithms—where the historical and current information obtained in block 310 is un-labeled and wherein the un-supervised ML algorithms can automatically cluster the information and identify trends in the information.

An exemplary use of an ML algorithm can be to label historical information related to the sessions of users of a plurality of WGs 120: how frequently are sessions opened, what is the average session duration, how many sessions they open in parallel, what is the resource consumption trend throughout the session, which application do they open during which hours. The supervised ML algorithms can be trained on the labeled session information to find statistical relations between an unclassified state of a given WG 120 and the label and to set the importance score of the given WG 120 accordingly. For example: the ML algorithm can learn which sessions are of a "desirable state" and which sessions are of an "undesirable state".

After determining the importance scores, the shared hardware and communication resources management system 200 can be further configured to perform one or more monitoring or management activities associated with one or more of the WGs 120, based on the importance scores (block 330).

The monitoring activities performed by the shared hardware and communication resources management system 200 can include providing a user of system 200 (for example: by making use of a user interface of system 200) with information relating to monitored WGs 120, wherein the monitored WGs 120 are selected based on their respective importance score.

In some cases, the monitored WGs 120 are selected based on a resource utilization threshold, wherein the resource utilization threshold depends on the importance scores of the monitored WGs 120.

An unlimiting example is a top priority screen displayed to a user of the system 200. The screen displays the WGs 120 which are most important to monitor and their respective condition to the user. The top priority screen displays WGs 120 with resource utilization above a resource utilization threshold (for example a 70% resource utilization threshold). For WGs 120 with a high importance score the resource utilization threshold can be lower (for example a 50% resource utilization threshold) causing WGs 120 with high importance score to appear on the top priority screen even when their resource utilization is only between 50% to 70%.

The management activities performed by the shared hardware and communication resources management system 200 can include one or more of: resource (i.e. one or more of: resource A 130-*a*, resource B 130-*b*, resource C 130-*c*, resource D 130-*d*, ..., resource N 130-*n*) scheduling, resource (i.e. one or more of: resource A 130-*a*, resource B 130-*b*, resource C 130-*c*, resource D 130-*d*, ..., resource N 130-*n*) allocation or resource (i.e. one or more of: resource A 130-*a*, resource B 130-*b*, resource C 130-*c*, resource D 130-*d*, ..., resource N 130-*n*) re-allocation, performance of automatic prevention measures for preventing failure of one or more WGs 120 to meet service level goals, performance of automatic remediation measures for remediating failure of one or more WGs 120 to meet service level goals or performance of automatic troubleshooting measures for troubleshooting one or more WGs 120.

Resource (i.e. one or more of: resource A 130-*a*, resource B 130-*b*, resource C 130-*c*, resource D 130-*d*, ..., resource N 130-*n*) scheduling can be based on a prioritization policy. In some cases, the prioritization policy indicates that WGs 120 having higher importance score are scheduled before WGs 120 having lower importance score.

In some cases, the management activities performed by the shared hardware and communication resources management system 200 are resource (i.e. one or more of: resource A 130-*a*, resource B 130-*b*, resource C 130-*c*, resource D 130-*d*, ..., resource N 130-*n*) allocation or resource (i.e. one or more of: resource A 130-*a*, resource B 130-*b*, resource C 130-*c*, resource D 130-*d*, ..., resource N 130-*n*) re-allocation can be based on a prioritization policy. In some cases, the prioritization policy indicates that WGs 120 having higher importance score are allocated or re-allocated with more resources (i.e. one or more of: resource A 130-*a*, resource B 130-*b*, resource C 130-*c*, resource D 130-*d*, ..., resource N 130-*n*) than WGs 120 having lower importance score.

In some cases, the management activities performed by the shared hardware and communication resources management system 200 are automatic prevention measures for preventing failure of one or more WGs 120 to meet service level goals. In these cases, more resources (i.e. one or more of: resource A 130-*a*, resource B 130-*b*, resource C 130-*c*, resource D 130-*d*, ..., resource N 130-*n*) are allocated for automatic prevention measures for WGs 120 having higher importance score than for WGs 120 having lower importance score. In some cases, the automatic prevention measures include one or more of the following: risk detection, optimization, problem analytics or log analytics.

In some cases, the management activities performed by the shared hardware and communication resources management system 200 are automatic remediation measures for remediating failure of one or more WGs 120 to meet service level goals. In these cases, more resources (i.e. one or more of: resource A 130-*a*, resource B 130-*b*, resource C 130-*c*, resource D 130-*d*, ..., resource N 130-*n*) are allocated for automatic remediation measures for WGs 120 having higher importance score than for WGs 120 having lower importance score. In some cases, the remediation measures are self-remediation measures performed by the respective WGs 120.

In some cases, the management activities performed by the shared hardware and communication resources management system 200 are automatic troubleshooting measures for troubleshooting one or more WGs 120. In theses cases, more resources (i.e. one or more of: resource A 130-*a*, resource B 130-*b*, resource C 130-*c*, resource D 130-*d*, ..., resource N 130-*n*) are allocated for automatic troubleshooting measures for WGs 120 having higher importance score than for WGs 120 having lower importance score. In some cases, the automatic troubleshooting measures are auto troubleshooting measures performed by the respective WGs 120.

Continuing the above unlimiting example, on specific calendar dates (for example: on Black Friday), WGs 120 that are associated with a retail functionality of an organization will have an importance score higher than the importance score of WGs 120 that are not associated with the retail functionality of the organization. The shared hardware and communication resources management system 200 can allocate more resources (i.e. one or more of: resource A 130-*a*, resource B 130-*b*, resource C 130-*c*, resource D 130-*d*, ..., resource N 130-*n*) to the retail functionality WGs 120 than to non-retail functionality WGs 120. The same applies to allocating resources (i.e. one or more of: resource A 130-*a*, resource B 130-*b*, resource C 130-*c*, resource D 130-*d*, ..., resource N 130-*n*) for the retail functionality WGs 120 for performance of automatic prevention measures, performance of automatic remediation measures or performance of automatic troubleshooting measures.

It is to be noted that, with reference to FIG. 3, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Attention is now drawn to FIG. 4, a flowchart illustrating an additional detailed and comprehensive example of a sequence of operations carried out for the management of shared hardware and communication resources, in accordance with the presently disclosed subject matter.

According to certain examples of the presently disclosed subject matter, shared hardware and communication resources management system 200 can be configured to perform a detailed shared hardware and communication management process 400, e.g. by shared hardware and communication resources management system 200 utilizing the shared hardware and communication management module 240.

It is to be noted that the detailed shared hardware and communication management process 400 is a detailed and comprehensive example of the shared hardware and communication management process 300 as explained, inter alia with respect to FIG. 3 above.

Shared hardware and communication resources management system 200 can be configured to obtain historical and current information indicative of past and current utilizations of portions of the shared hardware and communication resources 110 by respective WGs 120, at a plurality of points-in-time, wherein the historical and current information includes WG 120 usage attributes of the respective WGs 120 at the respective points-in-time (block 410). It is to be noted that block 310 is similar to block 310 of the shared hardware and communication management process 300.

Shared hardware and communication resources management system 200 can be further configured to identify, for at least one given WG 120, currently resource sharing WGs 120, being WGs 120 that currently share at least part of the shared hardware and communication resources 110 (i.e. one or more of: resource A 130-*a*, resource B 130-*b*, resource C 130-c, resource D 130-d, ..., resource N 130-n) with the given WG 120 (block 420). It is to be noted that block 420 is optional.

It is to be noted that currently resource sharing WGs 120 for a given WG 120 can change over time as the resources (i.e. one or more of: resource A 130-a, resource B 130-b, resource C 130-c, resource D 130-d, ..., resource N 130-n) utilized by the given WG 120 change over time. The shared hardware and communication resources management system can optionally and alternatively utilize the importance scores of the currently resource sharing WGs 120 of the given WG 120 to further determine the importance score for the given WG 120 as further detailed herein with regards to block 440 below.

Shared hardware and communication resources management system 200 can be further configured to identify, for at least one given WG 120, currently connected WGs 120, being WGs 120 that are currently connected to the given WG 120 (block 430). It is to be noted that block 430 is optional.

It is to be noted that the connection can be a bi-directional or a unidirectional communication link between the given WG 120 and the currently connected WGs 120. It is to be noted that currently connected WGs 120 for a given WG 120 can change over time as the communication connections between the WGs 120 change over time. The shared hardware and communication resources management system can optionally and alternatively utilize the importance scores of the currently connected WGs 120 of the given WG 120 to further determine the importance score for the given WG 120 as further detailed herein with regards to block 440 below.

For this purpose shared hardware and communication resources management system 200 can be further configured to determine importance scores for one or more of the WGs 120, based on the historical and current information of the respective WG 120 wherein at least part of the respective WGs 120 importance scores are optionally determined also based on importance scores of the resource sharing WGs 120 of the respective WG 120 and alternatively or optionally on the importance scores of the connected WGs 120 of the respective WG 120 (block 440).

The shared hardware and communication resources management system 200 can determine importance scores based on the historical and current information obtained in block 410, as explained above in block 320 of the shared hardware and communication management process 300. Optionally and additionally, the importance score can be determined for a given WG 120 also based on importance scores of the resource sharing WGs 120 of the given WG 120 (as determined in block 420) and/or on the importance scores of the connected WGs 120 of the given WG 120 (as determined in block 430). In some cases, the importance score of the given WG 120 is determined based on the highest importance score of the resource sharing WGs 120 and/or of the connected WGs 120. In other cases, the importance score of the given WG 120 is determined based on an average of the importance scores of the resource sharing WGs 120 and/or of the connected WGs 120. In some additional cases, the importance score of the given WG 120 is determined based on another relation between the importance scores of the resource sharing WGs 120 and/or the importance scores of the connected WGs 120.

In an unlimiting example, the importance score of a given WG 120 which has no direct user connections, such as a WG 120 that functions as a database server, can be set on the highest priority score of the connected WGs 120 of the given WG 120. In this example the connected WGs 120 function as application servers which are connected to the database server and the database server will get the importance score of the application server with the highest importance score.

After determining the importance scores, shared hardware and communication resources management system 200 can be further configured to identify, based on the importance score, a sub-group of WGs 120, being high importance WGs 120, and wherein the high importance WGs 120 are allocated with more resources than other WGs 120 that are not part of the high importance WGs 120 (block 450). It is to be noted that block 450 is optional.

The high importance WGs 120 receive a VIP treatment from the shared hardware and communication resources management system 200 with regards to the amount of resources (i.e. one or more of: resource A 130-a, resource B 130-b, resource C 130-c, resource D 130-d, ..., resource N 130-n) of monitoring and management activities (e.g. scheduling, allocation or re-allocation, automatic prevention, automatic remediation, automatic troubleshooting, etc.) allocated to high importance WGs 120. It is to be noted that the members of the high importance WGs 120 group can change over time, as the importance score of the WGs 120 change over time.

High importance WGs 120 can be monitored in more advanced ways. For example, resource (i.e. one or more of: resource A 130-a, resource B 130-b, resource C 130-c, resource D 130-d, ..., resource N 130-n) allocation adjustments made by the shared hardware and communication resources management system 200 for high importance WGs 120 can dynamically change upon high risk assessment. A risk 30o assessment service of the shared hardware and communication resources management system 200 can fetch logs of high importance WGs 120 more frequently than logs are collected for other WGs 120 that are not members of the high importance WGs 120. This ensures that WGs 120 of high business importance to an organization will receive better treatment.

An example VIP treatment for high importance WGs 120 that are serverless functions can be for the shared hardware and communication resources management system 200 to keep these serverless functions warm, in order to decrease their response times.

Other examples of VIP treatment for high importance WGs 120 can be: to pin CPU core and RAM using affinity rules, to insure compute allocation to high importance WGs 120. To migrate high importance WGs 120 to s stronger host machine. To monitor high importance WGs 120—to allow a user that is part of a help desk of the organization to focus on business important issues.

In addition, VIP treatment for high importance WGs 120 can include: activating or disabling certain automated actions for the high importance WGs 120. Maintaining a cache of database connections for the high importance WGs 120. Changing a power management scheme of host machines of high importance WGs 120. Changing DRS affinity rules and anti-affinity rule, for host machines of high importance WGs 120, for example: disable Disaster Recovery System (DRS) for high importance WGs 120 to insure a certain Quality of Service (QoS) level the high importance WGs 120 are getting from the specific host machine and won't migrate to another host machine. Reserving resources for high importance WGs 120. Changing storage policies by defining different datastore resource allocation policies for high importance WGs 120. Setting different threshold for high importance WGs 120 for space use. Avoiding input/output latency bottlenecks for high importance WGs 120 by using a specific datastores. Setting different aggressiveness for datastore DRS when it serves high importance WGs 120. Blocking WGs 120 that are not high importance WGs 120 from putting a risk on the environment serving the high importance WGs 120 by migrating them to another host machine. Running the high importance WGs 120 only on host machines with an Operating System (OS) above a certain version and with highest level of security patches.

In addition, the shared hardware and communication resources management system 200 can be configured to further determine the importance score of a given WG 120 also based on the historical and current information of similar WGs 120, being WGs 120 having similarity characteristics that are similar to the characteristics of the given WG 120. These similarity characteristics include: types of users conducting one or more sessions, types of sessions, type of executing applications, actual consumptions of resources over a given time duration, virtual compute level, Input/output Operations Per Second (IOPS), network communication latency, network communication bandwidth, storage communication bandwidth, number of remote connections to the WG, operating system characteristics, running backup services or other characteristics that can be used to find similarity between WGs 120.

For example, if a given WG 120 is similar to WGs 120 that have high importance scores, the shared hardware and communication resources management system 200 can determine the given WG 120 importance score to be equal to the highest importance score of the similar WGs 120. The importance score of the given WG 120 can be determined to be an average of the important scores of the similar WGs 120 or in any other relation with the important scores of the similar WGs 120.

After determining the importance scores in block 440, the shared hardware and communication resources management system 200 can be further configured to perform one or more monitoring or management activities associated with one or more of the WGs 120, based on the importance scores (block 460). It is to be noted that block 460 is similar to block 310 of the shared hardware and communication management process 300 as detailed above.

It is to be noted that, with reference to FIG. 4, some of the blocks can be integrated into a consolidated block or can be broken down to a few blocks and/or other blocks may be added. Furthermore, in some cases, the blocks can be performed in a different order than described herein (for example, block 430 can be performed before block 420, etc.). It is to be further noted that some of the blocks are optional (for example, block 420, block 430 and block 450). It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A system for management of shared hardware and communication resources shared by a plurality of Workload Generators (WGs), the system comprising a processor configured to:
   obtain historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time, wherein the WG usage attributes include one or more active directory groups that a user, conducting a session on the respective WGs, is associated with;
   determine importance scores for one or more of the WGs, based on the active directory groups associated with the user conducting the session on the respective WG; and
   perform resource allocation or resource re-allocation associated with one or more of the WGs, wherein shared hardware and communication resources are allocated or re-allocated based on a prioritization policy indicating that WGs having higher importance score are allocated or re-allocated with more resources than WGs having lower importance scores.

2. The system of claim 1, wherein the processor is further configured to identify, for at least one given WG of the WGs, currently resource sharing WGs of the WGs, being WGs that currently share at least part of the hardware and communication resources with the given WG; and wherein the importance score of at least part of the WGs is determined also based on a resource sharing environment score of the resource sharing WGs of the respective WG.

3. The system of claim 2, wherein the resource sharing environment score a) is an average of the importance scores of the resource sharing WGs of the respective WG, or b) is based on the importance scores of the resource sharing WGs of the respective WG.

4. The system of claim 1, wherein the processor is further configured to identify, for at least one given WG of the WGs, currently connected WGs of the WGs, being WGs that are currently connected to the given WG; and wherein the importance score of at least part of the WGs is determined also based on a connected environment score of the connected WGs of the respective WG.

5. The system of claim 1, wherein the importance scores are determined also based on the historical and current information of similar WGs, being WGs having similarity characteristics that are similar to the characteristics of the respective WG.

6. The system of claim 1, wherein the processing resource is further configured to identify, based on the importance score, a sub-group of WGs of the WGs, being high importance WGs, and wherein the high importance WGs are allocated with more resources than other WGs of the WGs that are not part of the high importance WGs.

7. The system of claim 1, wherein each of WGs is one of the following: a virtual machine, a microservice, a serverless function or a software container.

8. A method for management of shared hardware and communication resources shared by a plurality of Workload Generators (WGs), the method comprising:
- obtaining, by a processor, historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time, wherein the WG usage attributes include one or more active directory groups that a user, conducting a session on the respective WGs, is associated with;
- determining, by the processor, importance scores for one or more of the WGs, based on the active directory groups associated with the user conducting the session on the respective WG; and
- performing, by the processor, resource allocation or resource re-allocation associated with one or more of the WGs, wherein shared hardware and communication resources are allocated or re-allocated based on a prioritization policy indicating that WGs having higher importance score are allocated or re-allocated with more resources than WGs having lower importance scores.

9. The method of claim 8, further comprising identifying, by the processor, for at least one given WG of the WGs, currently resource sharing WGs of the WGs, being WGs that currently share at least part of the hardware and communication resources with the given WG; and wherein the importance score of at least part of the WGs is determined also based on a resource sharing environment score of the resource sharing WGs of the respective WG.

10. The method of claim 9, wherein the resource sharing environment score is: a) an average of the importance scores of the resource sharing WGs of the respective WG, or b) based on the importance scores of the resource sharing WGs of the respective WG.

11. The method of claim 8, further comprising identifying, by the processor, for at least one given WG of the WGs, currently connected WGs of the WGs, being WGs that are currently connected to the given WG; and wherein the importance score of at least part of the WGs is determined also based on a connected environment score of the connected WGs of the respective WG.

12. The method of claim 8, wherein the importance scores are determined also based on the historical and current information of similar WGs, being WGs having similarity characteristics that are similar to the characteristics of the respective WG.

13. The method of claim 8, further comprising identifying, by the processing resource, based on the importance score, a sub-group of WGs of the WGs, being high importance WGs, and wherein the high importance WGs are allocated with more resources than other WGs of the WGs that are not part of the high importance WGs.

14. The method of claim 8, wherein each of WGs is one of the following: a virtual machine, a microservice, a serverless function or a software container.

15. A non-transitory computer readable storage medium having computer readable program code embodied therewith, the computer readable program code, executable by at least one processor of a computer to perform a method of:
- obtaining, by the processor, historical and current information indicative of past and current utilizations of portions of the shared hardware and communication resources by respective WGs of the plurality of WGs, at a plurality of points-in-time, wherein the historical and current information includes WG usage attributes of the respective WGs at the respective points-in-time, wherein the WG usage attributes include one or more active directory groups that a user, conducting a session on the respective WGs, is associated with;
- determining, by the processor, importance scores for one or more of the WGs, based on the active directory groups associated with the user conducting the session on the respective WG; and
- performing, by the processor, resource allocation or resource re-allocation associated with one or more of the WGs, wherein shared hardware and communication resources are allocated or re-allocated based on a prioritization policy indicating that WGs having higher importance score are allocated or re-allocated with more resources than WGs having lower importance scores.

* * * * *